UNITED STATES PATENT OFFICE.

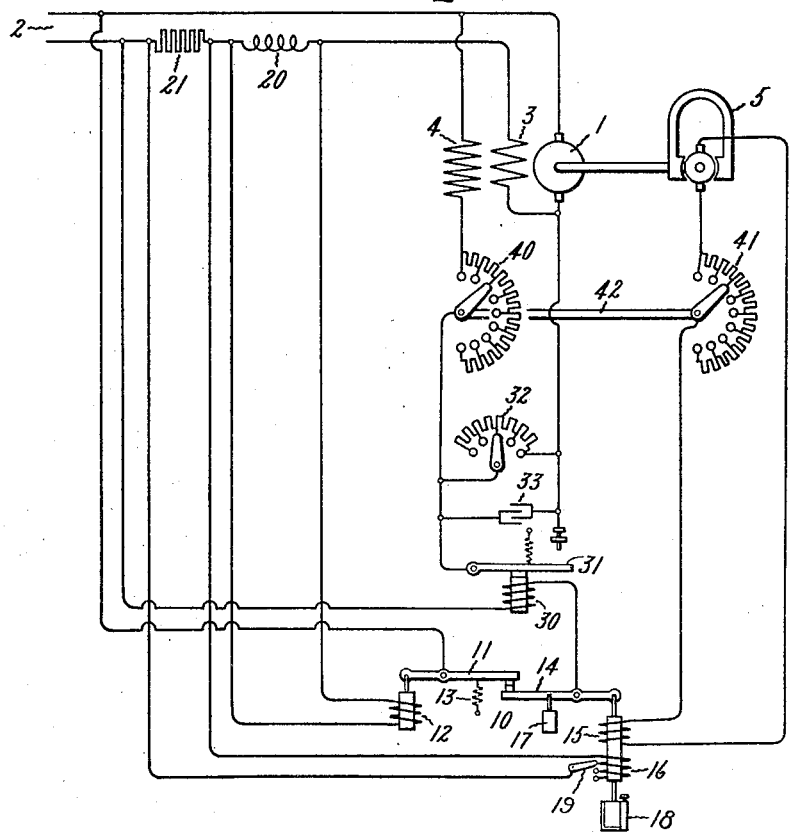
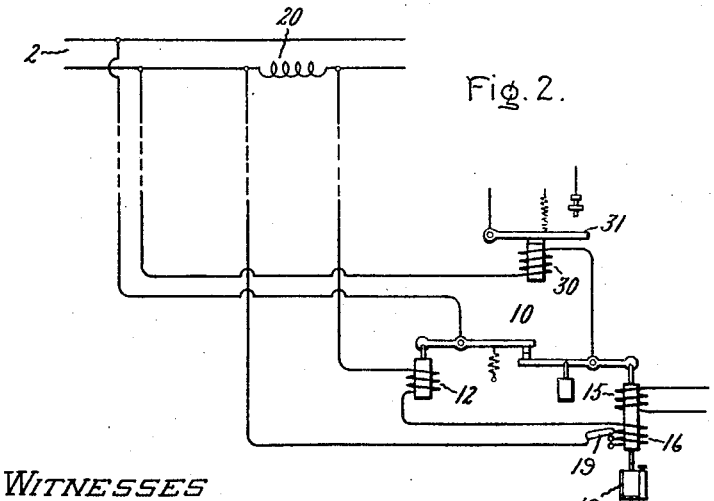

HAROLD V. GREEN, OF CHICAGO, ILLINOIS, ASSIGNOR TO GENERAL ELECTRIC COMPANY, A CORPORATION OF NEW YORK.

SPEED CONTROL OF D. C. MOTORS.

1,190,150.     Specification of Letters Patent.     Patented July 4, 1916.

Application filed May 27, 1914. Serial No. 841,199.

*To all whom it may concern:*

Be it known that I, HAROLD V. GREEN, a citizen of the United States, residing at Chicago, in the county of Cook, State of Illinois, have invented certain new and useful Improvements in Speed Control of D. C. Motors, of which the following is a specification.

My invention relates to the speed control of direct current motors and more especially to the adaptation of a vibratory regulator of the "Tirrill" type to this purpose.

It is well known that the speed of a direct current motor may be controlled by varying the field excitation, as by means of a resistance in series with the shunt field winding of the motor. For constant speed, this resistance may be controlled by an electrically operated switch arranged to insert and remove the same from the field circuit, the resultant effect being determined by the relative length of time during which the resistance is left in circuit. Such an arrangement is shown in the U. S. patents to Stebbins, #849,582, and Tirrill, #1,029,480, and in each of these patents the coil operating the switch is energized from a generator driven by the motor. With such devices, however, there must be an actual change of speed before the regulator can be set in operation, and the result will be a fluctuation of speed above and below the exact speed desired. This fluctuation or hunting is undesirable, since it may readily be cumulative and produce a considerable speed variation.

The object of my invention is to devise a regulator which shall hold the speed of a direct current motor constant at any desired value.

Another object is to provide a regulator which shall be responsive to tendencies toward change of speed of the motor and hold actual constant speed at any load, and independent of voltage fluctuations in the supply.

A further object is to make the regulator accurately responsive to sudden variations of motor armature current and at the same time to provide for compensation for changes in load.

Still another object is to provide convenient means for adjusting the regulator so that it will hold constant speed at any desired point in the speed range of the motor.

According to my invention, a regulator of the "Tirrill" type is used to control a relay which short-circuits a resistance in the shunt field circuit of the motor.

Preferably, the regulator will have two floating contacts, although this is not essential, and the solenoid coil controlling one of these contacts will be supplied with a current proportional to the armature current by being connected in shunt with an inductive resistance which is in series with the motor. The solenoid coil controlling the other contact will be supplied with current from a generator driven by the motor. Opposing this coil I also provide a compensating coil supplied with a current proportional to the motor armature or load current. For convenience in adjusting the regulator to correspond with different speed settings of the motor, I provide two rheostats, simultaneously adjustable, one in the shunt field circuit of the motor and the other in the circuit of the coil supplied by the generator.

My invention will be best understood by reference to the accompanying drawing, in which—

Figure 1 is a diagrammatic view showing one arrangement of the apparatus involved, and Fig. 2 is a view showing another arrangement of certain of the parts.

The motor 1, whose speed is to be regulated, is supplied with current from the mains 2, and as shown is constructed with both a series field 3 and a shunt field 4. Obviously, however, the series field is not essential. Driven by the motor, and here shown as mounted on the same shaft, is a pilot generator 5. This generator may be of any size or type, but if its use is solely for the purpose of regulation, it is preferably of the magneto type and of small size. A regulator 10, whose arrangement constitutes the object of my invention, is here shown as of the "Tirrill" type employing two floating contacts controlled by solenoids. As will later appear, such a construction is not absolutely essential for speed regulation, and the regulator will operate to hold approximately constant speed if one of the contacts remains in a fixed position. In the form shown, a pivoted contact arm 11 is controlled by a solenoid 12 and a spring 13. The other contact arm 14 is controlled by solenoids 15 and 16 acting upon a core whose weight is balanced by a weight 17.

In order that the movement of this contact may be smooth and gradual, I provide a dash-pot 18 of ordinary construction operatively connected with the solenoid core. In series with the motor are an inductive resistance 20 and a non-inductive resistance 21. The solenoid 12 is connected in shunt with the resistance 20, while the solenoid 16 is connected in shunt with the resistance 21. Preferably, the solenoid winding 16 is provided with taps and a switch 19 arranged to vary the number of operative turns thereof. The solenoid 15 is supplied with current from the generator 5.

Controlled by the floating contacts of the regulator 10 is a relay 30 acting upon a spring-held armature 31 arranged to short-circuit a resistance 32 in the shunt field circuit of the motor. Preferably, a condenser 33 is connected across the contacts of this relay, which prevents sparking. In circuit with the shunt field of the motor is a rheostat 40, and in circuit between the solenoid coil 15 and the generator 5 is an adjustable rheostat 41. The movable arms of these rheostats are operatively connected in any desired manner, as by the shaft 42 here shown. In practice it will be found desirable to design the rheostat 40 with resistances of such value that the various steps will give equal increments of speed variation of the motor, while the rheostat 41 will be designed with steps having equal resistances.

Another arrangement is shown in Fig. 2, where in place of the two resistance shunts 20 and 21 in the mains 2, I use simply an inductive resistance 20 and connect the solenoid coils 12 and 16 in series across this shunt. Otherwise, the arrangement is the same as in Fig. 1.

The various elements going to make up the arrangement illustrated are all well known of themselves, and, accordingly, the diagrammatic showing and the preceding description are believed to be sufficient to enable any one skilled in the art to utilize the invention. The objects of my invention, however, will be more readily understood by considering the operation of the particular arrangement of the apparatus herein illustrated.

Let us suppose that the motor is running at some speed, say 900 R. P. M. Now, if we hold the floating contacts apart the relay 30 will be deënergized, and, consequently, the regulator will have no effect upon the speed, since the resistance 32 will be constantly short-circuited. If, now, we force the floating contacts together and hold them thus, the relay 30 will attract the armature 31 and remove the short-circuit around the resistance 32, thereby decreasing the field excitation, whereupon the motor will reach a speed of say 1,000 R. P. M. Let us now release the contact arm 14, still holding the contact arm 11 in a fixed position. If the rheostats 40 and 41 have been set to hold the motor at 950 R. P. M., then the excess voltage of the pilot generator 5 will raise the plunger within the solenoid 15 and open the floating contacts, thereby strengthening the motor field. The speed will then diminish to a value slightly below 950 R. P. M., at which point the voltage of the pilot generator will have fallen to such a value that the floating contacts will close and the motor field weaken, thus causing an increase in the speed of the motor. The operation described will now be repeated, and the speed of the motor will fluctuate up and down above and below 950 R. P. M., in an attempt to hold constant voltage on the pilot generator. Thus, it can be seen that approximate speed regulation is obtained as described in the patents previously referred to, but that actual speed regulation cannot be obtained without actual speed variation, which in itself will give a tendency to hunting. Now, let us hold the contact lever 14 in a fixed position, and allow the lever 11 to vibrate. If the floating contacts close, the field current of the motor will weaken, which will tend to increase the speed of the motor. However, assuming constant line voltage and constant load, the increase in speed of the motor is only possible by means of an increase in the armature current. Such an increase in the armature current will result in pulling down the core within the solenoid 12, thereby opening the floating contacts. This will strengthen the field of the motor, which will tend to decrease its speed and decrease the armature current. As soon as the armature current has fallen sufficiently to allow the spring 13 to overcome the force of the solenoid 12, the floating contacts will close, and the previous operation will be repeated. Since the lever 14 with its attached spring and solenoid core will have but a small moment of inertia, it will be in a state of practically constant vibration and the resultant effect will be determined by the relative proportion of the time during which the contacts are opened and closed. From this description, however, we see that the regulator will operate even if the contact attached to the lower arm 14 is held in fixed position, and that the result will be the regulation of the motor speed, even though there is no change in the voltage of the pilot generator, which is the same as saying that there is no change in the speed of the motor. We have, therefore, attained one of the objects of the invention, viz: good regulation without speed variation.

It is now desirable to consider the operation of the regulator with changes in load on the motor. If the motor is operating at no load and at a definite speed and full load is suddenly thrown on, there will be a permanent increase in the current supplied to the motor armature, and hence in the pull exerted by the solenoid 12. The effect of this will be to raise the contact carried by the lever arm 11 and cause it to vibrate about a fixed point higher than previously. This will tend to keep the floating contacts open the greater proportion of the time, and thereby increase the motor speed; but an increase in motor speed would mean an increase in the voltage of the pilot generator 5, and hence an effort to hold the floating contacts still farther apart. In order to avoid this undesirable result, I have provided a compensating coil 16 which opposes the solenoid coil 15 and with an increase in load tends to raise the contact carried by the lever arm 14 adjacent to the contact of the lever arm 11. By the proper design of the coil 16, exact compensation for changes in load may be effected so that the regulator will operate properly to hold constant speed at all loads. By adjustment of the switch 19 and the operative turns in the coil 16, it is possible to adjust the regulator so that the speed of the motor will increase with increasing load, that is to say, over-compensation; or decrease with increasing load, that is to say, under-compensation.

In order that the sudden fluctuations of armature current produced by the rapid opening and closing of the regular contacts may have a proper effect on the rapidly vibrating lever arm 11, I have shown the shunt 20, around which the solenoid 12 is connected, as an inductive shunt, so that the proper proportions of the rapidly fluctuating armature current will be forced to pass through this coil and not be kept out by the inductance thereof. Since the core within the coil 16 is connected within the dash-pot 18, its movements are necessarily gradual, and such an arrangement is not necessary. Preferably, therefore, a separate non-inductive shunt will be provided, as shown in Fig. 1; but, if desired, the coils 12 and 16 may be connected in series across a common inductive shunt, as illustrated in Fig. 2.

Fluctuations in the voltage of the supply mains would ordinarily cause variations in the motor speed; but with the regular operating as herein shown, an increase in voltage would first be made manifest by an increase in the armature current. This would, however, act upon the solenoid 12 to open the floating contacts, and thereby increase the motor field and decrease its speed. A reverse operation would occur upon a decrease in voltage: Thus, we see that the regulator is able to anticipate and control the effects of external voltage fluctuations.

With the apparatus arranged to hold constant speed at any particular point, the current in the coil 15, supplied from the pilot generator 5, is practically constant, and the movement of the lever 14 is slight and the changes gradual, due to the dash-pot 18. If, now, it is desired to adjust the apparatus to hold constant speed at another value by adjustment of the rheostat 40, it will only be necessary at the same time to adjust the rheostat 41 and increase the resistance in the circuit supplied by the pilot generator 5. This will mean that in order to maintain the same current in the coil 15 there must be an increase in the voltage of the pilot generator; or, in other words, there must be a definite increase in the speed of the motor for each step on the rheostats 40 and 41. Obviously, the movement of the rheostat arms will give an indication of the speed at which we are to hold the motor constant.

Thus, it will be seen that I have provided an arrangement whereby the speed may be held constant at any desired value, and that it is adapted for variable speed drive for paper-making machines.

Obviously, the arrangement may be equally well applied to numerous other uses, and various changes and modifications in the particular arrangement shown and described may be made. I, accordingly, do not desire to be limited to the precise arrangement shown, but seek to cover in the appended claims those modifications and combinations which fall properly within the true scope and spirit of my invention.

What I claim as new and desire to secure by Letters Patent of the United States, is:—

1. In combination, a direct current motor provided with a shunt field winding, a resistance in series with said field winding, a relay for short-circuiting said resistance, an inductive resistance in series with said motor, a solenoid operated contacter controlling said relay and connected in shunt with said inductive resistance to hold said motor at constant speed.

2. In combination, a direct current motor provided with a shunt field winding, a generator driven by said motor, a resistance in series with said motor field winding, a relay for short-circuiting said resistance, floating contacts controlling said relay, a solenoid, controlling one of said contacts, supplied with a current proportional to the motor armature current, and another solenoid, controlling the other contact, supplied with current by said generator.

3. In combination, a direct current motor provided with a shunt field winding, a generator driven by said motor, a resistance in series with said motor field winding, a relay for short-circuiting said resistance, floating contacts controlling said relay, a solenoid, controlling one of said contacts, supplied with a current proportional to the motor armature current, another solenoid, controlling the other contact, supplied with current by said generator, and a third solenoid opposing the latter and also supplied with a current proportional to the motor armature current.

4. In combination, a direct current motor provided with a shunt field winding, a generator driven by said motor, a resistance in series with said motor field winding, a relay for short-circuiting said resistance, floating contacts controlling said relay, an inductive resistance in series with said motor, a solenoid controlling one of said contacts connected in shunt with said inductive resistance, another solenoid controlling the other contact electrically connected to said generator, a non-inductive resistance in series with said motor, and a third solenoid opposing the second mentioned solenoid and connected in shunt with said non-inductive resistance.

5. In combination a direct current motor provided with a shunt field winding, a generator driven by said motor, a resistance in series with said motor field winding, a relay for short-circuiting said resistance, floating contacts controlling said relay, an inductive resistance in series with said motor, a solenoid controlling one of said contacts connected in shunt with said inductive resistance, another solenoid controlling the other contact electrically connected to said generator, and a third solenoid opposing the second mentioned solenoid and responsive to the motor armature current.

6. In combination, a direct current motor provided with a shunt field winding, a direct current generator driven by said motor, an adjustable resistance in series with said motor field winding, a relay for short-circuiting a portion of said resistance, floating contacts controlling said relay, a solenoid, controlling one of said contacts, supplied with a current proportional to the motor armature current, another solenoid, controlling the other contact, supplied with current from said generator, an adjustable resistance in circuit with the last named solenoid, and means for simultaneously adjusting said resistances.

In witness whereof, I have hereunto set my hand this 20 day of May 1914.

HAROLD V. GREEN.

---

It is hereby certified that in Letters Patent No. 1,190,150, granted July 4, 1916, upon the application of Harold V. Green, of Chicago, Illinois, for an improvement in "Speed Control of D. C. Motors," errors appear in the printed specification requiring correction as follows: Page 2, line 1, for the word "movement" read *movements;* same page, line 118, for the word "lower" read *lever;* line 125, for the word "good" read *speed;* page 3, lines 33 and 52, for the word "regular" read *regulator;* and that the said Letters Patent should be read with these corrections therein that the same may conform to the record of the case in the Patent Office.

Signed and sealed this 22d day of August, A. D., 1916.

[SEAL.]

F. W. H. CLAY,
*Acting Commissioner of Patents.*

Cl. 171—229.